United States Patent [19]

Duurland et al.

[11] Patent Number: 5,371,634
[45] Date of Patent: * Dec. 6, 1994

[54] ARRANGEMENT FOR OBTAINING PRERECORDED DIGITAL MUSIC CASSETTES

[75] Inventors: Jozef M. Duurland; Johannes J. Roering, both of Baarn; Willem L. Van Der Kruk, Eindhoven, all of Netherlands

[73] Assignee: U.S. Philips Corporation, New York, N.Y.

[*] Notice: The portion of the term of this patent subsequent to Sep. 9, 2010 has been disclaimed.

[21] Appl. No.: 233,541

[22] Filed: Apr. 26, 1994

Related U.S. Application Data

[60] Continuation of Ser. No. 39,607, Mar. 24, 1993, abandoned, which is a division of Ser. No. 686,327, Apr. 16, 1991, Pat. No. 5,243,470.

[51] Int. Cl.$^5$ .............................................. G11B 5/86
[52] U.S. Cl. ........................................ 360/15; 360/32; 360/54
[58] Field of Search .................. 360/15, 16, 32, 54; 369/84, 85

[56] References Cited

U.S. PATENT DOCUMENTS

| | | | |
|---|---|---|---|
| 4,758,902 | 7/1988 | Okamoto et al. | 360/15 X |
| 4,899,230 | 2/1990 | Sherritt | 360/15 |
| 5,021,893 | 6/1991 | Scheffler | 360/15 |

*Primary Examiner*—Andrew L. Sniezer
*Attorney, Agent, or Firm*—Edward W. Goodman

[57] ABSTRACT

An arrangement for reading a digital audio signal from a master medium (7) and storing it in a digital storage medium (10, 90, 90') at a first bit rate in a first step, and for repeatedly reading the digital audio signal from the storage medium and recording the digital audio signal on a recording medium (20') at a second bit rate in a second step. The digital storage medium is adapted to store a digital information signal which is a representation of a first music program (M1) and a digital information signal which is a representation of a second music program (M2). The arrangement (FIG. 1b) is further adapted to repeatedly read the digital information signal representing the first music program from the digital storage medium while reading the digital information signal representing the second music program into the digital storage medium in the second step.

5 Claims, 7 Drawing Sheets

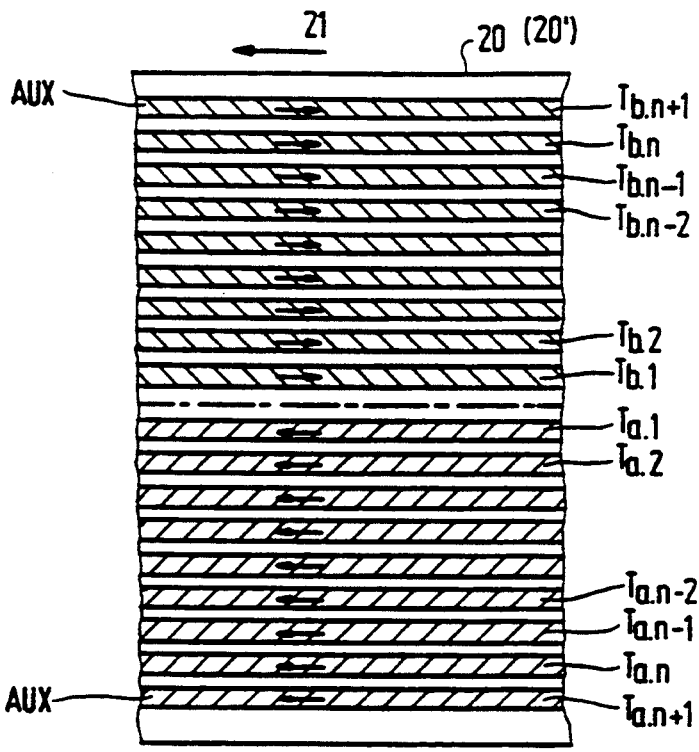
FIG. 2
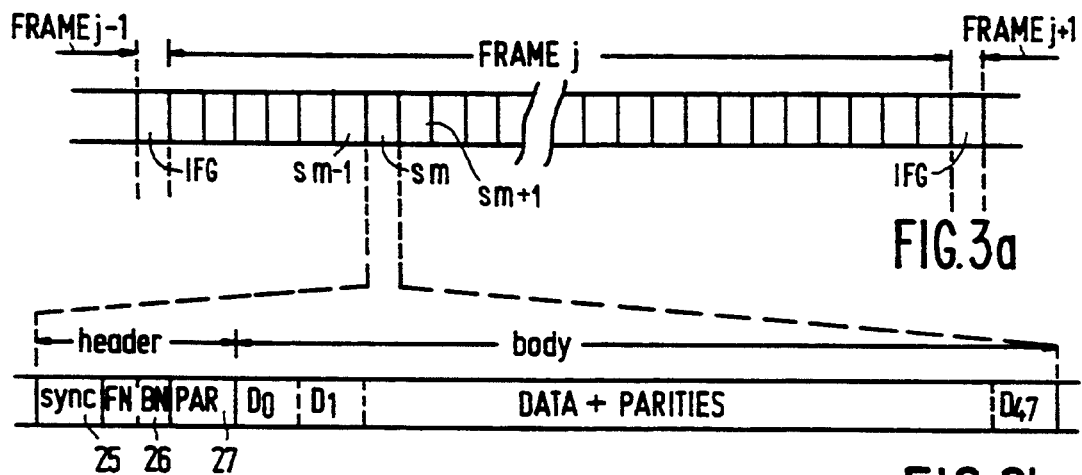
FIG. 3a
FIG. 3b
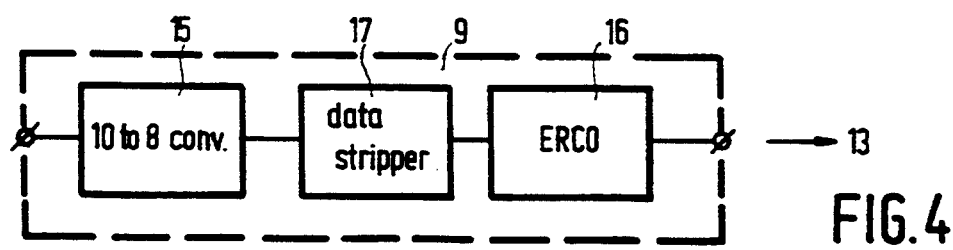
FIG. 4

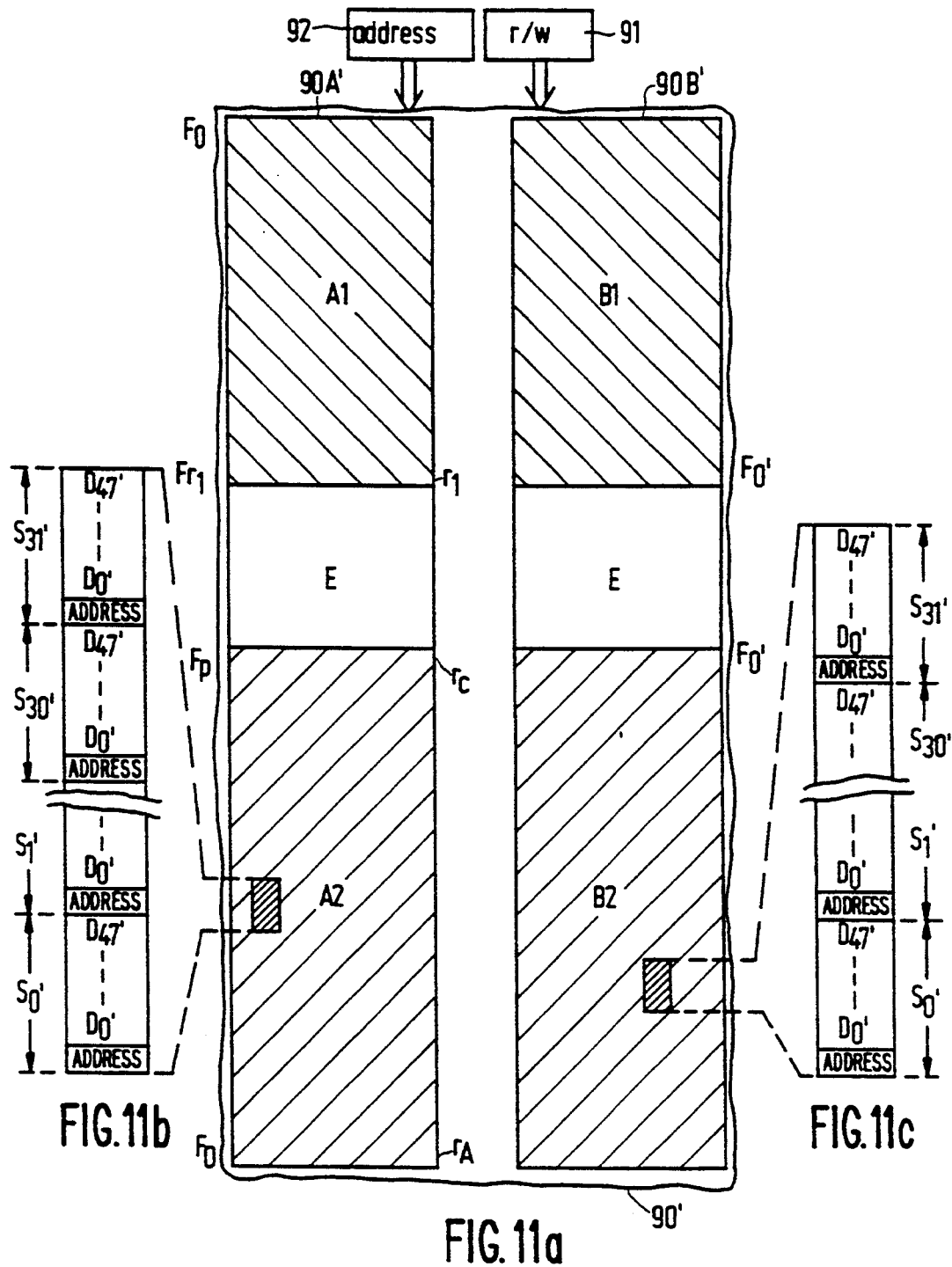

ARRANGEMENT FOR OBTAINING
PRERECORDED DIGITAL MUSIC CASSETTES

This is a continuation of application Ser. No. 08/039,607, filed on Mar. 24, 1993, abandoned which is a divisional application of Ser. No. 07/686,327, filed on Apr. 16, 1991, now U.S. Pat. No. 5,243,470.

BACKGROUND OF THE INVENTION

1. Field of the Invention

The invention relates to an arrangement for reading a digital audio signal from a master medium and storing it in a digital storage medium at a first bit rate in a first step, and for repeatedly reading the digital audio signal from the digital storage medium and recording it on a recording medium at a second bit rate in a second step to obtain prerecorded record carriers on each of which the digital audio signal, which is a representation of a specific music program, has been recorded, the arrangement comprising read means for reading the digital audio signal from the master medium, a digital storage medium, recording means for recording the digital audio signal on the recording medium, first circuit means for processing the digital audio signal read from the master medium and for applying said processed digital audio signal to the digital storage medium, second circuit means for processing the digital information read from the digital storage medium to obtain a digital signal which substantially corresponds to the digital audio signal, and the invention also relates to an arrangement for reading a digital audio signal from a master medium and storing it in a digital storage medium at a first bit rate, and to an arrangement for repeatedly reading a digital audio signal from a digital storage medium and recording it on a record carrier at a second bit rate.

2. Description of the Related Art

An arrangement of the type defined in the opening paragraph is known from U.S. Pat. No. 4,410,917. Such an arrangement is used as a duplicating arrangement for the fabrication of prerecorded digital magnetic tape cassettes, also referred to as the digital compact cassettes. In this arrangement the digital storage medium, which stores digital information corresponding to a certain music program, is read repeatedly and is recorded on the recording medium. The (second) bit rate during duplication is then generally higher than the (first) bit rate during the storage of the digital information in the digital storage medium.

SUMMARY OF THE INVENTION

It is an object of the invention to utilize the digital storage medium more effectively.

To this end the arrangement in accordance with the invention is characterized in that the digital storage medium is adapted to store a digital information signal which is a representation of a first music program and a digital information signal which is a representation of a second music program, in that the arrangement is adapted to write a digital information signal representing the second music program into the digital storage medium in a third step, which third step viewed in time at least partly concurs with at least a part of the second step of repeatedly reading out of the digital information signal representing the first music program.

The invention is based on the recognition of the fact that the digital storage medium can be used in such a manner that in the time interval of the second step in which the digital information corresponding to a first music program is read repeatedly from the digital storage medium in addition the digital information corresponding to a second music program can be written into another section of the digital storage medium.

This enables time to be saved because it is not necessary to postpone loading of the second music program until the relevant time interval of the second step has elapsed.

It is then possible to utilize an arrangement with which the music programs can be stored in the storage medium only after each other and can also be read from the storage medium only after each other, but which enables a second music program to be written at the same time that the first music program is read out repeatedly. In that case, if the second and the third step are both performed immediately after the first step and assuming that the second step takes a longer time than the third step, the third step will be situated wholly within the time interval occupied by the second step.

The repeated read-out of the second music program in this arrangement is not possible until the second step has been completed. However, if the arrangement is capable of simultaneously reading the information of two music programs repeatedly, the repeated read-out of the second music program may commence immediately after the third step.

It is obvious that the write in of a third music program cannot begin until the repeated read-out of the first and the second music program has been completed. It is then assumed that the digital storage medium is capable of storing at the most two music programs.

Obviously the digital storage medium in the prior-art arrangement should have a storage capacity necessary to store a digital information signal representing a music program of the maximum length that can be recorded on a record carrier in a prerecorded cassette.

The digital storage medium, which is used in the arrangement in accordance with the invention and which should be capable of storing two music programs, should therefore in fact be twice as large. However, the arrangement may be characterized further in that the digital storage medium has a storage capacity which is smaller than twice the storage capacity required for the storage of a digital information signal representing a music program of the maximum length that can be recorded on a prerecorded record carrier.

For this use is made of the fact that music programs as recorded on record carriers in prerecorded cassettes are generally shorter than the maximum playing time.

It is now assumed that the digital music cassettes have a maximum playing time of 90 minutes. For the storage of two music programs this would require a storage capacity of 180 minutes of music. However, popular music programs generally have a length of only 50 minutes at the most. Thus, it is adequate for the digital storage medium to have a smaller storage capacity of, for example, 100 minutes of audio information instead of a storage capacity which is twice as large.

Two methods of storing the two music programs in the digital storage medium are proposed.

To this end a first embodiment of the arrangement in accordance with the invention is characterized in that for addressing all the storage locations in the digital storage medium, the addressing means are adapted to generate addresses, starting with a first address indicating a first storage location in the digital storage medium, subsequently successive addresses indicating consecutive storage locations in the digital storage medium, and ending with a final address indicating a last storage location in the digital storage medium, in that for storing in the digital storage medium the digital information signal representing the first music program, the addressing means are adapted to generate consecutive addresses, starting with the first address and followed by successive addresses in the direction of the final address, and in that for storing in the digital storage medium the digital information signal representing the second music program, the addressing means are adapted to generate a sequence of addresses, starting with the final address and followed by the successively preceding addresses in the direction of the first address.

In the first method there are two fixed addresses from which the addressing means can start addressing the storage locations in the digital storage medium. One address (the first address) corresponds to, for example, a first storage location in the storage medium and the other address (the final address) then corresponds to a last storage location in the storage medium.

A further (third) music program is then stored in the storage medium either from the first address towards the final address "from the top to the bottom", or from the final address towards the first address "from the bottom to the top". This depends on whether the second or the fourth step is completed first.

During the storage of the second music program, the addressing means generate the addresses in a sequence opposite to the sequence of the addresses during the storage of the first music program.

A second embodiment of the invention is characterized in that for addressing all the storage locations in the digital storage medium, the addressing means are adapted to generate the addresses starting with a first address indicating a first storage location in the digital storage medium, subsequently successive addresses indicating successive storage locations, and ending with a first final address indicating a last storage location in the digital storage medium, in that for storing in the digital storage medium the digital information signal representing the first music program, the addressing means are adapted to generate successive addresses, starting with the first address, subsequently successive addresses in the direction of the first final address up to and including a second final address, in that for storing in the digital storage medium the digital information signal representing the second music program, the addressing means are adapted to generate successive addresses, starting with the address following the second final address, subsequently successive addresses in the direction of the first final address up to and including a third final address, and in that for storing in the digital storage medium the digital information signal representing a third music program, the addressing means are adapted to generate successive addresses, starting with the address following the third final address and subsequently successive addresses in the direction of the first final address.

In this second method there are no fixed addresses from which the addressing means start to address the storage locations in the digital storage medium if a new music program is to be stored in the storage medium. In that case a new music program is stored in the digital storage medium immediately after the preceding music program.

In the second embodiment the digital storage medium, in fact, has no end because the digital storage medium is coupled end-around. This is achieved in that the addressing means, after they have addressed the last storage location in the storage medium, subsequently address the first storage location in the storage medium.

Thus, the storage of the third music program in the digital storage medium is effected partly over the first music program. During the storage of the music programs, the addressing means thus generate addresses in a sequence which is always the same.

BRIEF DESCRIPTION OF THE DRAWINGS

Embodiments of the invention will now be described in more detail, by way of example, with reference to the following Figures. In these Figures:

FIG. 1a showing the mastering step,

FIG. 1b showing the dupplication step, and

FIG. 1c showing the step of loading the prerecorded record carriers into the cassettes;

FIG. 2 shows the configuration of tracks as recorded on the master tape and the record carrier to be loaded into the cassettes;

FIG. 3a illustrates the structure of the information in the form of frames recorded in a track on the record carrier, and FIG. 3b illustrates the structure of a frame;

FIG. 4 gives an example of the signal processing unit in which the signal read from the master tape is processed before it is stored in the digital storage medium;

FIGS. 11a–11c illustrate the method of storing information for two different prerecorded music cassettes in the digital storage medium.

DESCRIPTION OF THE PREFERRED EMBODIMENT

Figure 1A:
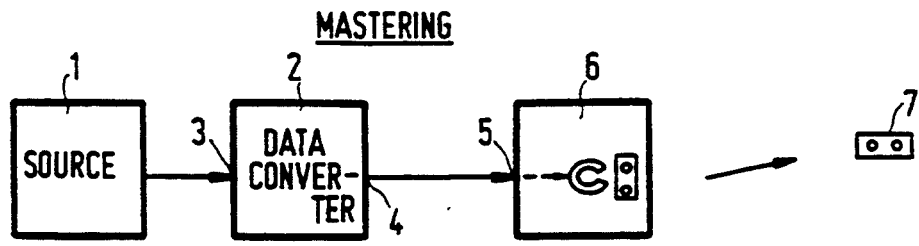
FIGS. 1a–1c illustrate the complete process of producing prerecorded cassettes.
Figure 1B:
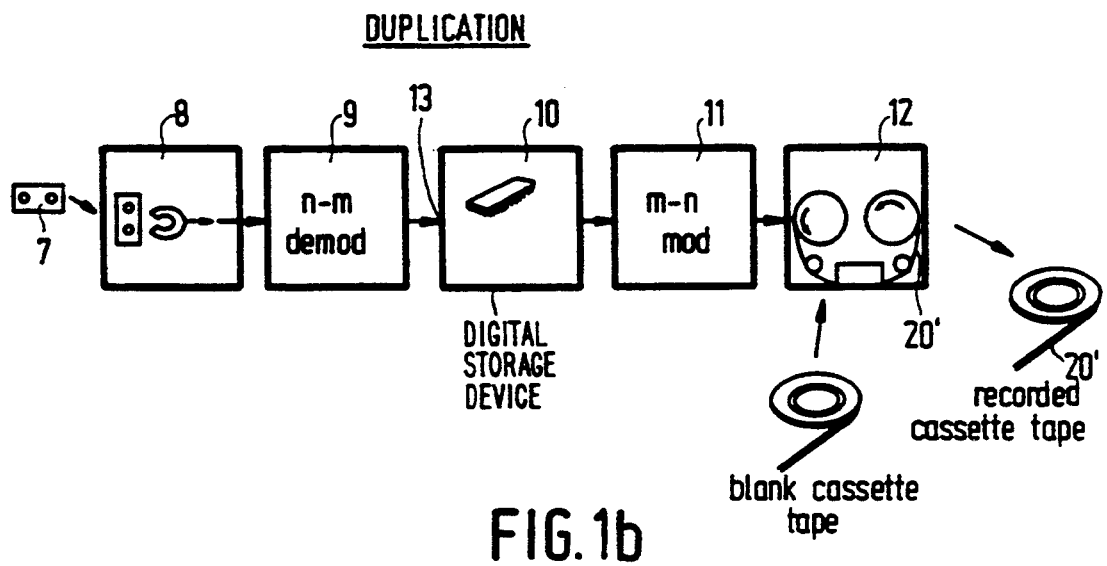
Figure 1C:
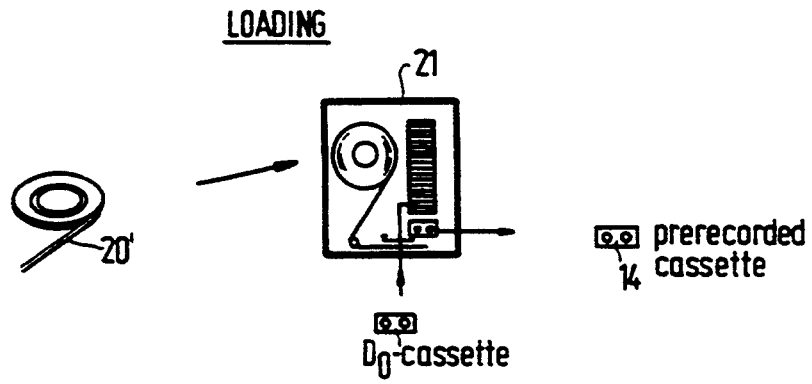

FIGS. 1a–1c illustrate the entire process of producing prerecorded digital audio cassettes. The mastering process will be described first with reference to FIG. 1a. The audio signal is available in analog or in digital form. This is indicated by means of the block bearing the reference numeral 1. The source 1 may be, for example, a professional audio recorder by means of which a recording has been made at an earlier stage, for example in a studio or a concert hall. This (analog or already digitized) audio signal is applied to a data converter 2. If the process illustrated in FIGS. 1a-1c is a process by means of which, for example, prerecorded SDAT cassettes are produced, the signal applied to the input 3 is converted into a digital signal in conformity with the SDAT format in the data converter 2. The SDAT signal format has been described comprehensively in the literature, see for example the book "The Art of Digital Audio" by John Watkinson, Focal Press 1988, in particular Chapter 9 and more specifically Section 9.20.

The signal converted by means of the converter 2 is applied to the input 5 of a professional recorder 6 via the output 4. In the present example of an SDAT signal the professional recorder 6 is an SDAT recorder. In this way a master tape is obtained which is accommodated in a master cassette 7. In this way master tapes are made of various recordings. It is obvious that it is also possible to produce prerecorded digital audio cassettes in conformity with another audio standard than the SDAT standard.

The audio signal may be processed in a slightly different manner, for example as described in the prior Netherlands Patent Application 90.00.039. This different signal processing method, which can be carried out by means of the data converter 2 shown in FIGS. 1a-1c is as follows.

A monophonic or a stereophonic audio signal can be applied to the input 3 of the converter 2. The converter 2 may comprise a sub-band encoder as described in one of the prior Netherlands Patent Applications 88.02.769 and 89.01.032, or the European Patent Application 289,080.

In such a sub-band coder the audio signal is digitized and sampled, if this has not happened already, and subsequently it is divided into a plurality of sub-band signals in a number of sub-band filters with sample frequency reduction. These sub-band signals are applied to, for example, an 8-to-10 converter. Such an 8-to-10 converter is described, for example, in European Patent Application 150,082. In this converter 8-bit data words are converted into 10-bit code words. It is possible to apply interleaving. All this serves to enable a subsequent error correction to be applied to the reproduced information.

The information is recorded on a master tape in a plurality of tracks which extend on this record carrier in the longitudinal direction of the record carrier. This means that for this purpose, the recorder 6 is constructed to divide the encoded information among, and to apply this divided and encoded information to, a number of outputs equal to the number of tracks. These outputs are coupled to an equal number of write heads. By means of these write heads the information is recorded in the tracks on the record carrier.

FIG. 2 shows diagrammatically the record carrier 20, as may have been accommodated in the master cassette 7 and on which the digital information is recorded. The record carrier 20 has n+1 tracks for the A-side, namely the tracks Ta.1 to Ta.n+1 and n+1 tracks for the B side, namely Tb.1 to Tb.n+1. The tracks Ta.n+1 and T.b+1 are auxiliary tracks in which an auxiliary signal is recorded as described in the aforementioned Netherlands Patent Application 90.00.039. The digitized and encoded audio information is recorded in the tracks Ta.1 to Ta.n and Tb.1 to Tb.n. The process of recording the digitized and encoded audio information will be described at a subsequent stage.

In the sub-band coding system described in Netherlands Patent Application 90.00.039, the speech signal bands can be divided into sub-bands whose bandwidths approximately correspond to the bandwidths of the critical bands of the human ear in the respective frequency ranges of the sub-bands, for which reference is made to the article "The critical band coder—digital encoding of speech signals based on perceptual requirements of the auditory system" by M. E. Krasner in Proc. IEEE ICASS 80, vol. 1, pp. 327–331, April 9 –11, 1980, in particular FIG. 2 in said article. Such a division has been selected because on the basis of psycoacoustic experiments, it may be anticipated that the quantization noise in such a sub-band will masked to an optimum extent by the signals in this sub-band if quantization allows for the noise masking curve of the human ear (this curve indicates the threshold value for noise masking in a critical band by a single tone in the centre of the critical band, cf. FIG. 3 in the article by Krasner).

In the case of a high-quality digital music signal, which in conformity with the Compact Disc standard is represented by 16 bits per signal sample at a sample rate of $1/T = 44.1$ kHz, it is found that the use of this known sub-band coding system with a suitably selected bandwidth and a suitably selected quantization for the respective sub-bands results in quantized encoder output signals which can be represented by an average number of approximately 2.5 bits per signal sample, while the quality of the replica of the music signal does not differ perceptibly from that of the original music signal in substantially all passages of substantially all kinds of music signals. It is obvious that a significant data reduction can be achieved by means of sub-band coding.

The sub-bands need not necessarily correspond to the bandwidths of the critical bands of the human ear. It is also possible for the sub-bands to have a different bandwidth, for example all having the same bandwidth, provided that allowance is made for this in determining the masking threshold.

FIG. 3a shows the content of one of the tracks Ta.1 to Ta.n and Tb.1 to Tb.n. The information in the tracks is made up of frames . . . , $F_{j-1}$, $F_j$, $F_{j+1}$, . . . interrupted by interframe gaps IFG. The interframe gaps have been described comprehensively in Netherlands Patent Application 90.00.635. For a further explanation of these interframe gaps reference is made to said Application. The frames each comprise a plurality of information blocks $S_{m-1}$, $S_m$, $S_{m+1}$, . . . In the present example the frames each comprise 32 information blocks.

FIG. 3b shows the content of a block such as the block $S_m$. Each block comprises a first block section (header) and a second block a section (body). The first block section comprises a synchronization word (sync) 25, which is a 10-bit word (on account of the 8 to 10 modulation prior to recording). The header further comprises an address word 26, again in the form of a 10-bit word. Prior to the 8-to-10 modulation, this 10-bit word has consequently been an eight-bit word, of which three bits correspond to the frame number FN and the remaining five bits correspond to the block number BN in the frame. Subsequently, the header also comprises a parity byte 27, which also takes the form of a 10-bit word.

As stated, the sync word 25 may be a 10-bit word. An example of this is the 10-bit digital word "0100111110" or the 10-bit digital word "0000111110". Depending on the digital sum value in the serial data stream either the one sync word or the other sync word is taken. It is to be noted that it is not necessary to have an 8-bit demodulated version of the sync words.

The frame number FN is a number which increases in conformity with a binary sequence in every consecutive frame. The block number BN indicates the position of a block S in the sequence of the blocks in a frame. The first block in a frame has the number 0, the next block has the number 1 etc. until the last block in a frame, which has the number 1 Fhex (which is 31 in decimal notation). The parity byte 27 enables an error detection to be applied to the address word 26. The parity byte 27 may, for example, be taken to be equal to the address word 26. The second block section (body) of a block $S_m$ comprises 48 data bytes, numbered D0 to D47. Each data byte again takes the form of a 10-bit binary word.

The content of the second block section (body) comprises both the digital information representing the original audio signal and the parity information (parity bytes), which enables an error correction to be applied to the digital information in the second block section. Consequently, one block comprises 51 bytes (510 channel bits) in total.

From Netherlands Patent Application 90.00.039 it appears that the frames in the auxiliary track Aux have the same length as the frames in the data tracks. It also follows that the information content of the blocks in the auxiliary track is equal to that of the blocks in the data tracks, namely 51 bytes.

From said Netherlands Patent Application it also follows that the number of blocks in a frame of the auxiliary track is smaller (i.e. four) than the number of the blocks in a frame of one of the data tracks (i.e. 32). This is because the bit rate with which the auxiliary information is written in the auxiliary track Ta.n+1 and Tb.n+1, respectively, is a factor of 8 lower than the bit rate with which the other information is written in the tracks Ta.1 through Ta.n and Tw.1 through Tw.n, respectively.

The duplication process will now be described with reference to FIG. 1b.

The master cassette 7 with the record carrier 20 is loaded into a downloader 8. The downloader 8 is a reproducing device with which the information is read from the tracks on the record carrier 20. It is then possible to first read the information from one side (side A) in the tracks Ta.1 through Ta.n+1 and subsequently the information from the other side (side B) in the tracks Tb.1 through Tb.n+1.

The tracks Ta.1 through Ta.n+1 are then read while the record carrier 20 in the master cassette 7 has a direction of transport as indicated by the arrows in the tracks in FIG. 2, i.e. from the right to the left. After side A has been read the transport direction is reversed and tracks Tb.1 through Tb.n+1 of side B are read.

However, alternatively both sides (side A and side B) may be read at the same time. This means that for one of the two sides (for example side B) the information is read in a direction opposite to that during normal reading of this side. The tracks Tb.1 through Tb.n+1 are then read while the direction of transport of the record carrier is as indicated by the arrow 21, i.e. opposite to the direction of transport during normal reading of side B. The information read from the tracks is combined to form a serial data stream of the frames and is applied to a signal processing unit 9. FIG. 4 shows the unit 9 in greater detail. In this signal processing unit 9, the data stream is first subjected to a demodulation, the 10-bit channel words in this data stream being converted into 8-bit information words by means of a 10-to-8 converter 15. This 10-to-8 conversion yields a 20% data reduction.

If desired, the demodulated signal may also be subjected to an error correction in an error corrector 16. Errors produced in manufacturing the master tape 7 and during the reproduction of the master tape can thus be removed, utilizing the parity bytes in the second block sections of the frames. Moreover, the sync words are removed during the 10-to-8 conversion because, as already stated, there are no 8-bit representations of these sync words in the demodulated form. Consequently, the 10-to-8 conversion results in a further data reduction because there is no longer any synchronizing information in the demodulated signal. However, even if there is an 8-bit demodulated version for the sync words, the 10-to-8 conversion in the demodulator 9 provides a data reduction in that the synchronizing-information content is now also reduced by 20%.

Subsequently, a further data reduction can be achieved in the signal processing unit 9. For example the interframe gaps IFG can be removed and, if desired, the parities 27 for the address words 26 and even the address words 26 themselves may be dispensed with. The address words 26 are used for storing the information in the second block section of the frame at the correct storage location in the error correction memory 65 or 65', for which reference is made to description of FIGS. 7a–7b.

If the address words 26 and the address parity word 27 are found not to be identical (for example as a result of an error during reading of the master tape 20) the address word is not used for the storage of the information in the error correction memory 65 or 65'. In that case it is assumed that the information in the second block section (body) of the frame has the correct sequence relative to the information in the second block sections of the preceding and the following frame. The information of the second block section is now automatically stored directly after the information of the second block section of the preceding frame stored in the error correction memory 65 or 65'. Removal of the address parity words 27 can be effected after the 10-8 conversion in the converter 15, for example in a data stripper 17.

Similarly, after they have been used for the storage of the information, the address words may be omitted from the second block section in the error correction memory 65 or 65'. The interframe gaps can also be removed by means of the 10-8 converter 15. This is because each frame comprises a fixed number of symbols. Consequently, the signal processing unit 9 knows when a frame has ended. Subsequently, the signal processing unit 9 awaits the detection of the sync word 25 of a subsequent frame, whose content is taken in and processed upon detection of this sync word.

The resulting information signal, if necessary after error correction in the error corrector, is applied to an input 13 of the digital storage device 10 and is stored in a digital storage medium, for example a volatile memory in the form of a random access memory (RAM), in the storage device 10.

The storage capacity of the storage medium should obviously be so large that after data reduction at least the information of one master tape 7 can be stored in the digital storage medium.

How the information is read into the digital storage medium will be explained later.

Figure 5:
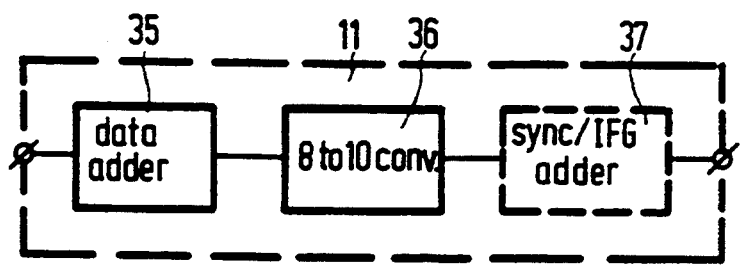
FIG. 5 shows an example of the signal processing unit in which the signal, after it has been read from the digital storage medium, is processed before it is recorded on the record carrier in order to obtain the prerecorded cassettes.

The digital storage medium in the digital storage device is now read in a cyclically recurrent manner. The information read is applied to a signal processing unit 11. FIG. 5 shows this signal processing unit 11 in greater detail. The information read is applied to an 8-to-10 converter 36. In this 8-to-10 converter 36 the 8-bit information words in the data stream, which are applied to the converter 36, are converted into 10-bit channel words, after which they are applied to the output of the converter 36. If the signal processing unit 9 has also removed the sync words, the address (parity) words and the interframe gaps from the signal, these should be reinserted in the unit 11. For this purpose the signal processing unit 11 may comprise a data adder 35. This data adder 35 can insert the 8-bit (representation of the) address parity words and, if applicable the address words in the information stream. Moreover, the unit 11 may comprise a sync word and interframe gap adder 37. In this adder 37 the sync words are reinserted into the information stream. The addition of synchronizing information to an information stream is well-known to those skilled in the art and therefore requires no further explanation.

The addition of the interframe gaps to the information stream has been described comprehensively in the prior Netherlands Patent Application no. 90.00.635, incorporated herewith by reference.

The information signal thus obtained is applied to the recording device 12. In this recording device the information signal from one side (side A or B) is again assigned to n write heads and is recorded in the n tracks Ta.1 through Ta.n on the record carrier 20, see FIG. 2. In the recording device 12 both sides A and B are recorded concurrently on the record carrier 20'. This means that if recording on the record carrier 20' is effected in a direction as indicated by the arrow 21 in FIG. 2, side B will be recorded in a direction opposite to that during normal recording and reproduction. This means that the information stream for the information signal of side B should be applied to the recording device 12 in a reversed sequence.

Moreover, recording on the record carrier 20' is generally effected at a speed higher than the speed at which the record carrier 20 is normally read or inscribed.

Ultimately this results in reels carrying the slave medium 20'. The content of one master tape has been recorded repeatedly in succession on this medium. Subsequently, these reels can be employed in the existing cassette loaders in order to obtain prerecorded cassettes. This is illustrated in further detail in FIG. 1c.

In this loading step the reel with the prerecorded record carrier 20' is loaded into a cassette loader 21. The loader 21 is also loaded with a number of empty cassettes, so-called $D_0$ cassettes, which do not yet contain any magnetic tape but only a short length of leader/trailer tape having both ends attached to the two reels in the cassette. This short length of leader/trailer tape is threaded out of the cassette in the loader 21 and is severed substantially half way the length of the tape. Subsequently, the loader severs a part of the slave medium (the record carrier) 20' having the length of and containing the recorded information from the record carrier in the master cassette 7. One end of this length of tape is spliced to the one free end of the leader/trailer tape and the other end is spliced to the other free end of the leader/trailer tape. Subsequently, the tape is threaded into the cassette and the prerecorded cassette 14 is ready for use.

Figure 6:
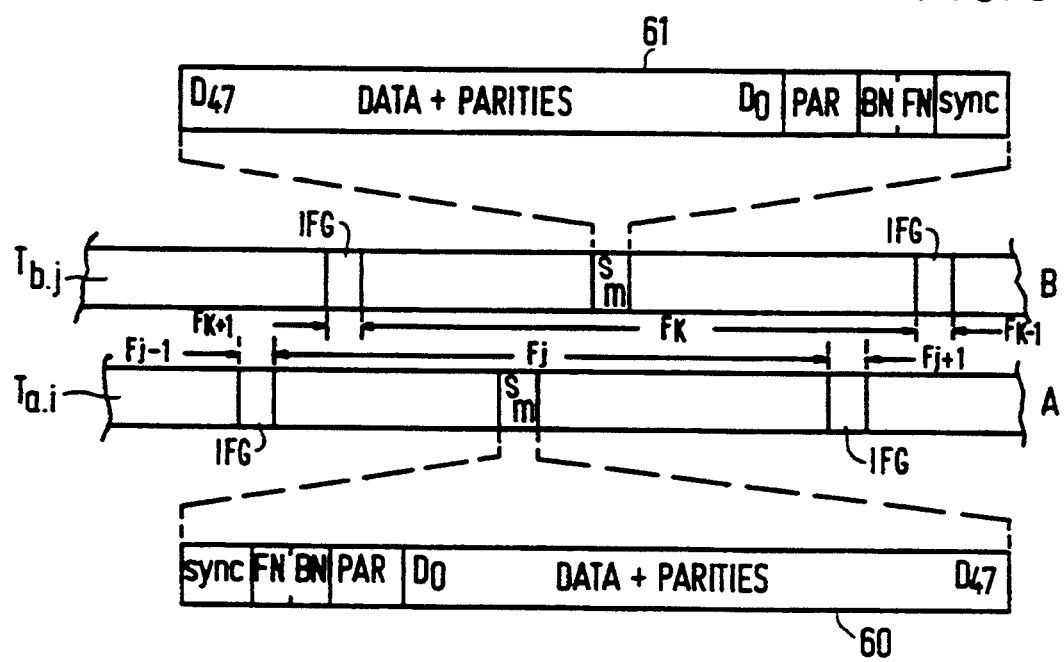
FIG. 6 shows a track on the A side and a track on the B side of the record carriers and the frames recorded in the tracks.

The storage of the information in the digital storage medium in the storage device 10 will now be described in further detail. The information of side A and side B of the record carrier is stored in the digital storage medium, the sides A and B being reproduced concurrently by the reproducing device 8. FIG. 6 shows one track Ta.i of side A and one track Tb.j of side B. It is evident that the frames in the track Ta.i have a frame number j which increases from the left to the right in the Figure. The frames in the track Tb.j have a frame number k which increases from the right to the left. FIG. 6 also illustrates the content of one block $S_m$ in a frame in the tracks Ta.i and Tb.j. This is indicated by means of the blocks bearing the reference numerals 60 and 61, respectively.

The contents of the blocks 60 and 61 have mutually reversed sequences. The block 60 is filled from the left to the right. The block 61 is filled from the right to the left. The simultaneous read out of the two sides A and B of the record carrier in the device 8 therefore means that two data streams are obtained, of which one data stream is supplied in a reversed sequence relative to the other data stream.

In the 10-to-8 demodulator 15, the data stream of side A is demodulated in the customary manner. The 10-bit channel words D0, D1, . . . . , D47 are amplied to the demodulator 15 one after the other. The modulation unit 84 in the modulator 15, see FIG. 8, serves to ensure that the bits of the 10-bit channel words to be demodulated are in the correct sequence. This means, for example, that the most significant bit comes first and the least significant bit comes last. This can be achieved, for example by means of a 10-bit shift register into which the 10-bit channel words, whose most significant bit comes first and whose least significant bit comes last, can be shifted from the back.

Figures 7A, 7B:
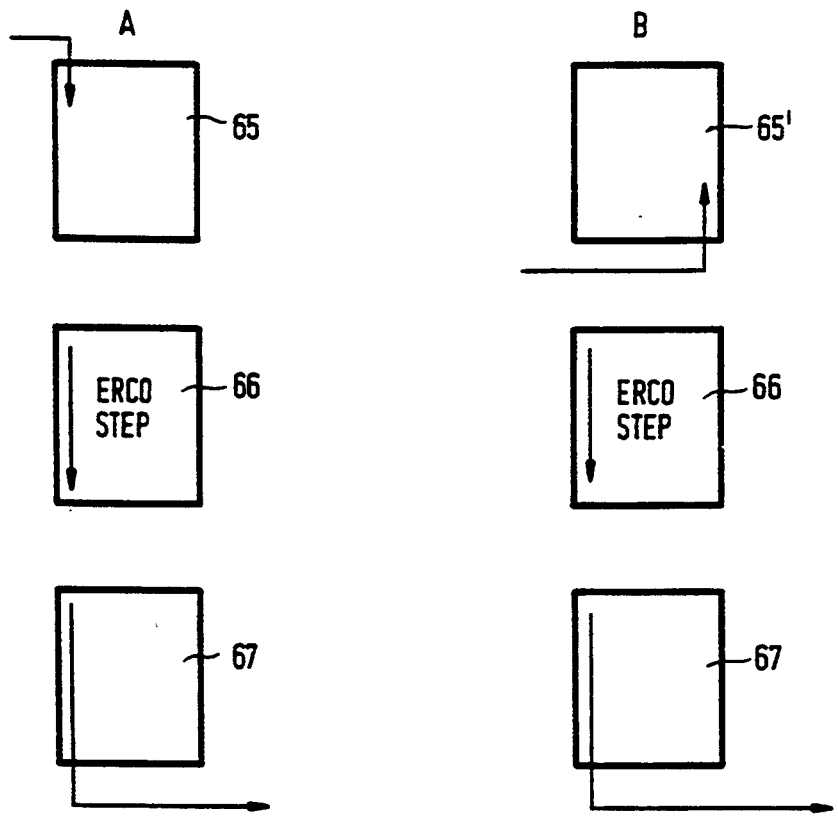
FIGS. 7a and 7b illustrate the error correction step as can be applied to the information from sides A and sides B, respectively, of the record carrier in the signal processing unit shown in FIG. 4.

The sequence of the 10-bit channel words is now correct. In a look-up table (also referred to as conversion table) it is ascertained which 8-bit information word corresponds to a 10-bit channel word. Subsequently, this eight-bit information word is outputted and is applied to a memory in the error corrector 16. In FIG. 7a this memory is represented diagrammatically by the reference numeral 65. The capacity of the memory is at least so large that all the 8-bit information words in one frame, i.e. 48×32 words, can be stored in this memory 65 (also referred to as a RAM page). This means that during the error correction step in the error corrector 16 the sync words 25, the address words 26, the parity words 27 and the interframe gaps IFG have been extracted from the data stream.

The memory 65 is filled in such a manner that the first 8-bit word of a frame is stored at the first storage location, the second 8-bit word is stored at the second storage location etc. until the last 8-bit word in the frame is stored at the last storage location of the memory 65. Once the memory 65 has been filled completely the information in this memory is subjected to an error correction step. This is indicated diagrammatically by 66 in FIGS. 7a and 7b. How the error correction step is performed is described inter alia in European Patent Application no. 90.200.128.8.

After this the content of the memory is read. This is indicated by means of the block 67 in FIGS. 7a and 7b. The 8-bit word at the first storage location is then read first, subsequently the 8-bit word in the second storage location is read etc. until the 8-bit word at the last storage location of the memory is read.

Subsequently the 8-bit address words 26' are reinserted at the correct positions, assuming that they have been stored in the storage device 10. In this respect it is to be noted that the overall storage capacity of the error correction unit 81 required for processing the signal from the A side is in fact three times the 48×32 storage positions, a storage position being understood to mean the storage capacity required for the storage of an 8-bit information word. This is because at the same time the 48×32 information words in a specific frame are read into the error correction unit 81 (the reference numeral 65 in FIG. 7a, for which 48×32 storage positions are required), the error correction step is performed upon the 48×32 information words of the preceding frame (the reference numeral 66 in FIGS. 7a and 7b, which also requires 48×32 storage positions), and the corrected 48×32 information words of a frame preceding the last-mentioned frame are read (which corrected information words are also stored at 48×32 storage locations, represented by the reference numeral 67 in FIGS. 7a and 7b).

The information stream thus obtained is applied to the storage device 10 in a sequence identical to the sequence with which the information has been read from the master tape 7.

Figures 9A, 9B, 9C:
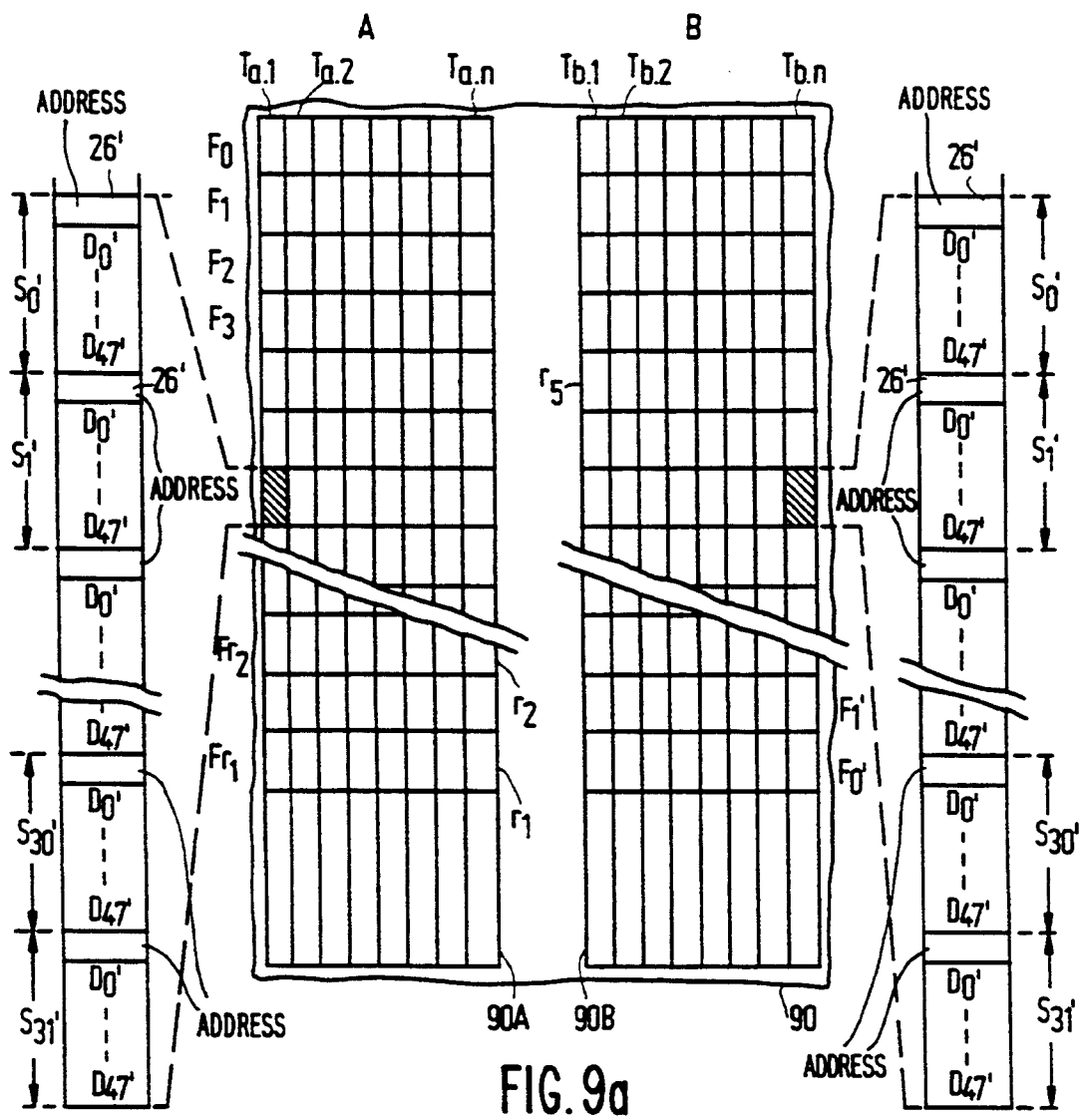
FIG. 9a shows the structure of the digital storage medium.
FIGS. 9b and 9c illustrate the manner in which a frame from side A and of side B, respectively, is stored in the storage medium.

FIGS. 9a-9c illustrate how the information stream thus obtained is stored in the digital storage medium 90. The section 90A of the storage medium 90 is intended for the storage from the information of side A. The memory 90A is divided schematically in rows and columns. The columns correspond to the tracks. The information from track Ta.1 is stored in the extreme left column. The information from track Ta.2 is stored in the adjacent column etc. The extreme right column contains the information from the track Ta.n.

It is to be noted that only the signal processing performed upon, and the storage of, the information in the tracks Ta.1 through Ta.n and the tracks Tb.1 through Tb.n will be described hereinafter. The signal processing performed upon, and the storage of, the auxiliary signals in the tracks Ta.n+1 and Tb.n+1 will not be described. This is because the structure of the auxiliary signals in these tracks is substantially identical to the structure of the signals in the other tracks, the difference being, as already stated hereinbefore, that the bit rate is a factor of 8 lower, so that the number of blocks which can be accommodated in one frame is 8× as small. For this reference is made to the afore-mentioned Netherlands Patent Application 90.00.039.

The information of the first frame $F_0$ of the tracks Ta.1 through Ta.n is stored in the first row of the memory 90A. The information of the second frame $F_1$ of the tracks Ta.1 through Ta.n is stored in the second row of the memory 90A. Finally the last frame $F_{r1}$ in the tracks Ta.1 through Ta.n is stored in the $r_1{}^{th}$ row of the memory 90A. FIG. 9b represents the content of the shaded rectangle in the memory 90A. This rectangle diagrammatically represents the storage capacity required for the information content of exactly one frame of a track. The blocks $S_0$ through $S_{31}$ in a frame are shown, each block comprising: the address word (8 bits long) and the 8-bit information words, which may have been corrected in the error corrector 16 and which bear the reference numerals $D_0'$ through $D_{47}'$, i.e. which are primed to indicate the difference between the 10-bit channel words $D_i$ and the 8-bit information words $D_i'$.

Figure 8:
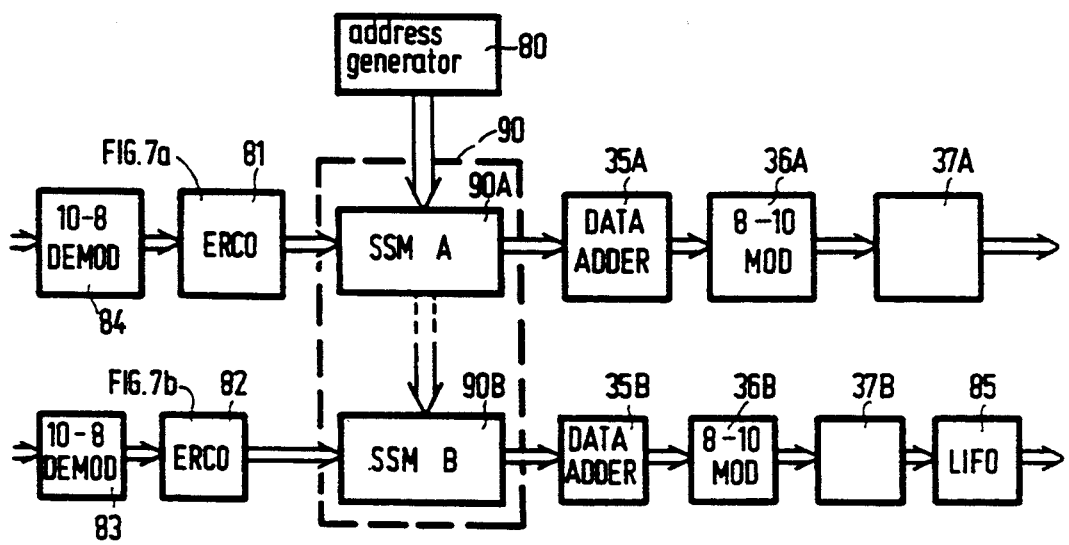
FIG. 8 shows the duplication step of FIG. 1b in further detail.

An address generator 80, see FIG. 8, supplies addresses to the memory 90A, so that the information supplied by the error correction unit 81, see FIG. 8, can be stored at the above-described locations in the memory 90A.

It may occur that side A is not filled completely with music information. This means that the last part of side A no longer contains any music information. This also means that, for example, the storage locations up to and including the row $r_2$ in the memory 90A are filled with information relating to music information and the remaining storage locations up to and including the row $r_1$ only contain "silence" (or a "zero" signal).

The signal processing performed upon the information of side B and the storage of this information in the memory 90 will now be described. As already stated, the information is read from tracks Tb.1 through Tb.n in the opposite direction.

For the 10-8 demodulation in the demodulator 9, more specifically the demodulation unit 83 in FIG. 8, this demodulation unit 83 should ensure that the bits of the 10-bit channel words to be demodulated are in the correct sequence. This means, for example, that the most significant bit should appear first and the least significant bit should appear last. This can be achieved, for example, by means of a 10-bit shift register into which the 10-bit channel words, of which the last (and least significant) bit comes first, can be loaded from the front.

The 10-bit channel words are now in the correct sequence, enabling 10-8 demodulation to be effected by means of the aforementioned conversion table. Subsequently the 8-bit information words are applied to a memory, namely the memory 65', see FIG. 7b, in the error corrector 16. The memory 65' should also have a storage capacity large enough to store all the 8-bit information words in one frame, i.e. again 48×32 words.

The 8-bit information words in a frame leave the 10-8 modulator in a reversed sequence. This means that the last information word of the last block is output first, then the penultimate information word of the last block, then the last information word of the panultimate block etc. . . . until finally the first information word of the first block in a frame appears.

In order to enable an error correction to be applied to the information in one frame this information should be stored back to front in the memory 65. In fact, this means that the first information word of the first block is stored in the first storage location of the memory 65', the second information word of the first word in the second storage location etc. . . . The last storage location then contains the last information word of the last block in the frame. This means, in fact, that the information of one frame of a track of side B as stored in the memory 65' is stored in exactly the same way as the information of a frame of a track of side A is stored in the memory 65. This implies that the error correction step can be applied to the content of the memory 65' in the same way as is illustrated for the content of the memory 65 in FIG. 7a. In FIG. 7b this is represented diagrammatically by 66. The process of reading out the memory after the error correction step is represented by 67 in FIG. 7b. This means that this memory is read out in the same way as the memory 65 in FIG. 7a. Consequently, the first 8-bit word in the first storage location of the memory 65' is read first, after which the 8-bit words are read from the subsequent storage location, and finally the 8-bit word is read from the last storage location. Subsequently, the 8-bit address words 26' are reinserted into the information stream at the correct positions.

The information stream thus obtained is applied to the digital storage device 10.

FIGS. 9a and 9c illustrate how this information stream from side B is stored in the digital storage medium 90, in particular the section 90B. The memory 90B is also divided diagrammatically in rows and columns. The columns correspond to the tracks. In the extreme left column the information from track Tb.1 is stored, in the adjacent column the information from Tb.2 is stored etc., and in the extreme right column the information from the track Tb.n is stored.

The first frame stored in the memory 90B is the first frame which is read from a track on side B. This is the last frame, the frame $F_m'$, of the information in each of the tracks recorded on side B. Since the end of the information on side B is generally not situated at exactly the same position on the record carrier as the beginning of the information on side A these last frames of side B will generally contain a silence (or zero) signal and will be stored as such in the first rows of the memory 90B. The first frames containing music information will be stored in a row $r_5$ further down in the memory 90B, said music information being information corresponding to the end of the music program of side B. This continues until the first frames $F_0$ of the tracks of side B are finally stored in the row $r_1$ in the memory 90B.

The sequence in which the frames of side B are stored in the memory 90B is the same as the sequence in which the frames are read from a track on side B of the record carrier when sides A and B are read simultaneously. The sequence of the data bytes $D_i'$ in a frame as stored in the memory 90B differs from the sequence in which the data bytes $D_i$ in a frame are read from the master tape. This sequence is reversed, as is indicated in FIG. 9c. As stated hereinbefore, this sequence is obtained by processing the frames in the error correction step as illustrated in FIG. 7b.

The addresses for addressing the rows and the columns in the memory 90 are generated by the address generator 80, see FIG. 8. In principle, one address generator is adequate for addressing the rows and columns of the two memories 90A and 90B. As the information on sides A and B of the master tape need not have been recorded necessarily at the same speed of transport the physical length of the frames on both sides of the tape need not necessarily be equal to each other. This means that during the simultaneous read out of sides A and B in the device 8, time differences (will) arise between the information read from side A and the information read from side B. This may imply that when the information is loaded into the memories 90A and 90B two address generators 80 are needed for separately addressing the storage locations in the memories 90A and 90B. Alternatively, the time base correction should be applied to the the signal of one of the two sides, so that only one address generator is needed.

The read-out of the information stored in the memories 90A and 90B will now be explained in greater detail with reference to FIGS. 8 and 9a–9c. The memories 90A and 90B are read out simultaneously, so that sides A and B are recorded simultaneously on the record carrier 20', see FIG. 1b.

The memory 90A is read normally. In succession, for all the tracks Ta.1 through Ta.n, the first frame $F_0$ is read first, then the next frame $F_1$, . . . etc. until the last frame is read. In this sequence the frames are applied to the data adder 35A, which forms part of the data adder 35 in FIG. 5. In said data adder 35A the 8-bit address parity words 27' are added. Subsequently, the data stream comprising the 8-bit information words is applied to the 8–10 converter 36A, which forms part of the 8–10 converter 36 in FIG. 5, in which the 8-bit information words are converted into 10-bit channel words, after which again the 10-bit sync words and the interframe gaps are inserted in block 37A, upon which the resulting information is recorded on side A of the record carrier 20'.

The memory 90B is read out as follows. The rows of storage locations are read out from the top to the bottom in FIG. 9a. The frames are applied to the data adder 35B, which forms part of the data adder 35 in FIG. 5. In this data adder the 8-bit address parity words 27' are added. Subsequently, the data stream comprising the 8-bit information words is applied to the 8–10 converter 36B, which forms part of the 8–10 converter 36 in FIG. 5, in which the 8-bit information words are converted into 10-bit channel words. Subsequently, the 10-bit sync words and the interframe gaps are reinserted in block 37B.

However, the 10-bit channel words in a frame are still in the wrong sequence for recording on the record carrier. Therefore, the information in a frame is stored in a last-in first-out (LIFO) register 85, see FIG. 8.

Thus, a frame as shown in FIG. 3b is loaded "front to back" into the register 85, the first block $S_0'$ being loaded first and the block $S_{31}'$, being loaded last, after which the interframe gap is read in. Subsequently, the LIFO register 85 is read out "back to front", the interframe gap being read out first and the sync word of the first block $S_0'$, being read out last. This is repeated for every subsequent frame of a lower sequence number. The information stream supplied by the register 85, including the content in the blocks, now has the correct sequence for recording on side B of the record carrier.

Figure 10:
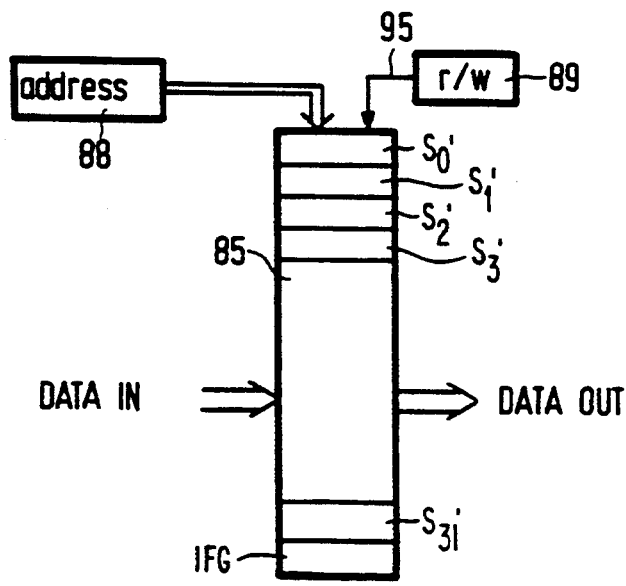
FIG. 10 gives an example of the last-in-first-out register of FIG. 8.

FIG. 10 shows an example of the register 85. The register comprises storage locations for the storage of the 31 blocks and the interframe gap in a frame. An address generator 88 generates addresses for addressing the storage locations. In a first cycle, in which a frame is read in, the successive storage locations 1, 2, 3, . . . etc. are addressed. In a subsequent cycle, in which this frame is read out, the storage locations are addressed in the reverse sequence. If the frame is read in in the first cycle the generator 89 applies a write control signal to the register 85 via the line 95. During read-out of this frame in the reverse sequence during the second cycle the generator 89 first applies a read control signal to the register 85 via the the line 95 for every position of the address generator 88, so that the 10-bit channel word stored at said storage location can be read. Immediately after this the generator 89 again generates a write control signal on the line 95 for the same position of the address generator 88. A 10-bit channel word of a subsequent frame is then read into the relevant storage location. During read-out in the second cycle of the frame which has been recorded in the first cycle in the register 85, a subsequent frame is read in at the same time. If the frame stored in the first cycle has been stored "from the top to the bottom" in the register the subsequent frame is stored "from the bottom to the top" in the register 85 at the end of the second cycle. In the subsequent third cycle the address generator 85 will again address the storeage locations from the top to the bottom. The 10-bit channel words of the second frame are read from the register 85 from the top to the bottom in this cycle, while at the same time the 10-bit channel words of a subsequent (third) frame are again stored from the top to the bottom in the register 85. The cycles described above are each time repeated.

The memories 90A and 90B should obviously have such a capacity that the information on both sides of the record carrier in the resulting cassettes 14 can be stored in the memories 90A and 90B during the duplication step.

When it is assumed that a cassette 14 can accommodate 90 minutes of music in total, the capacity of the memory 90 should be such that the information corresponding to these 90 minutes of music can be stored in this memory. This means that the memories 90A and 90B should each be capable of storing the information corresponding to 45 minutes of music.

Popular music cassettes contain an average of about 50 minutes of music, i.e. approximately 25 minutes of music on each side. This fact can be utilized if it is desired to use the memory 90 more intensively.

In the digital version of the memory 90, it is possible that the content of another master tape for a subsequent order can be stored in an empty part of the memory 90 in the time in which a music program is duplicated (i.e. the memory 90 is read in a cyclically repeated manner to obtain the record carrier 20′). When it is assumed that this is desirable for all the music programs to be duplicated, i.e. also for two music programs of 90 minutes length each, the memory 90 should have a capacity which is twice as large, so that it is capable of storing the information corresponding to three hours of music in the memory.

However, since the total amount of music on a music cassette, as already stated, is often less than one hour, it is not necessary to make the capacity of the memory 90 twice as large. In principle, a memory 90 with the original storage capacity of 90 minutes of music will be adequate. In that case it is possible to duplicate, for example, a music program of 50 minutes and to load a second music program of 40 minutes into the memory 90 at the same time. However, this imposes restrictions on the choice of the two music programs processed in this way. Greater freedom is obtained when the storage capacity of the memory 90 is made slightly larger, for example by giving it a storage capacity corresponding to 100 or 120 minutes of music. This means that enough storage capacity is available for the storage of information corresponding to the music of two music cassettes each containing 25 minutes of music per side.

The advantage is that a substantially smaller storage capacity in the memory 90 is required than in the case that the storage capacity would be doubled.

The storage of the information corresponding to the music content of the two music cassettes in an, if desired, expanded memory 90′, is illustrated in FIGS. 11a–11c.

A1 and B1 denote the information corresponding to the music of one music cassette as loaded into the memories 90A′ and 90B′, respectively, from a first master tape. This storage corresponds exactly to the storage as illustrated in FIG. 9. This means that the first frame $F_0$ of side A is stored in the first memory row, the second frame $F_1$ is stored in the second memory row, ... etc., the content of a frame as stored in a storage location corresponding to a specific row and a specific column being indicated in FIG. 9b. The information of side B is stored in the reverse sequence for the frames, the content of a frame as stored in a storage location corresponding to a specific row and a specific column being illustrated in FIG. 9c.

A2 and B2 denote the information corresponding to the music of a second music cassette, as loaded into the memories 90A′ and 90B′ from a second master tape 7.

It is clearly visible that the first frame $F_0$ of side A is now stored at the last row of the memory, the second frame $F_1$ at the penultimate row ... etc., the last frame $F_p$ being stored in a row $r_c$. FIG. 11b illustrates the content of a storage location corresponding to a row and a column. It is obvious that the sequence of this content, which corresponds exactly to one frame, is exactly reversed in comparison with that of the content as illustrated in FIG. 9b.

Since side B is read backwards the frames of side B are stored in section B2 of the memory 90B′ in a sequence which is exactly the reverse of that of the frames of side A. The content of a storage location corresponding to a row and a column in section B2 is illustrated in greater detail in FIG. 11c. Obviously, the sequence of the words in a frame is exactly the opposite of the sequence illustrated in FIG. 9c. The advantage of the storage method as described above will be set forth hereinafter.

For a first order of a number of prerecorded cassettes with a specific music program the information of this program is loaded into the memory 90′, see the sections A1 and B1. Moreover, there is a a second order for a number of prerecorded cassettes with a specific second music program. After the first step, in which the (first) music program is stored in the sections A1 and B1, the information stored in the sections A1 and B1 in the memory 90′ can be read out repeatedly in a subsequent first duplication step to obtain the record carrier(s) 20′ for said first order. At the same time the information of the second music program can be stored in the memory 90′. This information is stored in the sections A2 and B2 of the memory 90′.

In the first duplication step, in the time interval in which the second music program is stored as information in the sections A2 and B2 in the memory 90′, a read/write pulse generator 91 alternately generates read and write pulses, which are applied to the memory 90′. During a read pulse the address generator 92 then generates an address in the sections A1 and B1, so that the information stored at the storage location corresponding to this address can be read from the memory. During a write pulse the address generator 92 generates an address in the sections A2 and B2, so that information applied to the memory 90′ from the unit 9 can be stored at the storage location having this address.

After the second music program has been stored in the sections A2 and B2 of the memory 90′ the sections A2 and B2 can be read repeatedly in the subsequent second duplication step to obtain the record carrier(s) 20′ for said second order.

If the duplication arrangement comprises only one signal processing unit 11 and only one recording device 12, see FIG. 1, this duplication of the second music program should wait until the first music program, i.e. the first duplication step, has been completed. However, if the duplication arrangement comprises a second signal processing unit 11′ (not shown) and a second recording device 12′ (not shown), which is coupled to the digital storage device 10 parallel to the signal processing unit 11 and the recording unit 12, both duplication steps can be performed concurrently if the first duplication step has not yet been completed. The digital storage device 10 should then supply the information of the two music programs to the first and the second signal processing units 11 and 11', respectively, in time multiplex. The pulse generator 91 now only generates read pulses. During every even read pulse the address, generator 92 generates an address in the sections A1 and B1, so that the information stored at the storage location corresponding to this address can be read from the memory and can be applied to the processing unit 11 via a switch (not shown), which is in such a position that the output of the storage device 10 is coupled to the input of the processing unit 11. During every odd read pulse the generator 92 generates an address in the sections A2 and B2, so that the information stored at the storage location corresponding to this address can be read from the memory and can be applied to the processing unit 11' via the switch, which is now in a position in which the output of the storage device 10 is coupled to the input of the second processing unit 11'.

Oviously, a similar line of reasoning is valid at the storage side of the digital storage device 10. If the arrangement comprises only one downloader 8 and one signal processing unit 9 the second music program cannot be stored in the storage device 10 until the first music program has been stored in the storage device.

If a second downloader 8' (not shown) and a second signal processing unit 9 (not shown) are available, which are coupled in parallel to the input 13 of the storage device 10 via a switch (not shown), the two music programs can be stored parallel in time. The pulse generator 91 then merely generates write pulses. During every even write pulse the address generator 92 generates an address such that information corresponding to the first music program and supplied by the signal processing unit 9 can be stored at the storage locations in the sections A1 and B1 of the meory 90' via the switch, which is in a position in which the output of the signal processing unit 9 is coupled to the input of the storage device 10. During every odd write pulse the address generator 92 generates an address such that information corresponding to the second music program and supplied by the signal processing unit 9' can be stored at storage locations in sections A2 and B2 of the memory 90' via the switch, which is now in the position in which the output of the signal processing unit 9' is coupled to the input of the storage device 10.

Now it is assumed that there is a third order for prerecorded cassettes with a third music program. If the arrangement comprises two downloaders 8 and 8' and two signal processing units 9 and 9' it is possible after one of the two duplication steps described above has been completed, to load the third music program into the memory 90' at the location of the music program whose duplication step has just been completed, via one of the downloaders and signal processing units which are not in use at that instant.

Now the method is described for the case that the arrangement comprises only one loader 8 and one signal processing unit 9. In that case the third music program cannot be stored in the memory 90' until the second music program has been loaded into the sections A2 and B2 of the memory 90'. Moreover, this is not possible until one of the two duplication steps described above has been completed. It is assumed that the first duplication step has been completed. In that case information corresponding to this third program will be stored in the memory 90' at the location of the first music program. This means that the information stored in the sections A1 and B1 is overwritten by the new information corresponding to the third music program. The frames of the third music program are thus stored in the memory 90' in the same sequence as the sequence of the frames of the first music program. This means that the first frames in the tracks are stored in the first row, the second frames in the second row, etc.

Even if the third music program is longer than the first music program it can still be stored in the memory 90'. The unused (non-occupied) part of the memory 90', which is referenced E, then becomes slightly smaller. However, it will be obvious that the third music program should not be so large that the required storage capacity in the memories 90A' and 90B' is larger than A+E together and B1+E together respectively. In that case the information in the sections A2 and B2 would be overwritten, which is not permissible.

The sequence of the music programs to be duplicated should always be such that each time when in a duplication step a music program is read from the sections A1 and B1, the remaining storage capacity A2+E and B2+E is adequate to load a following music program and when a music program is read from the sections A2 and B2 the remaining storage capacity A1+E and B1+E is adequate to store a following music program.

If the two music programs were stored directly after one another and, where possible, contiguously to each other in the memory 90', this would impose more restrictions as to the choice of the music programs which can be stored after one another in the memory 90'.

Storing two music programs directly after one another in the memory 90' in fact means that the sections A2 and B2 will be stored "higher" in the memory 90'. If the information in the sections A1 and B1 has been copied repeatedly onto the record carrier 20' in a first duplication step, it is possible after this to store a third music program instead of the information in the sections A1 and B1. This third music program then should not be larger than the first music program. The freedom as to the choice of the third music program is then restricted in comparison with the storage as illustrated in FIGS. 11a–11c.

The advantage of the method of storage as described with reference to FIGS. 11a–11c is not only that a greater freedom is obtained as to the choice of the length of the third music program but also that the initial addresses of the two music programs stored in the storage medium are fixed, i.e. they are the same as the first and the last address. The beginning of both music programs is therefore always stored in a fixed storage location in the storage medium 90'. The read-in or read-out of the first music program therefore always begins at the address corresponding to the first memory row. Subsequently, the addresses increase until the address word corresponding to the memory row $r_1$ is reached. The addresses can be generated for example by means of a counter which counts up in one direction. For the read-in or read-out of the second music program addressing begins at the address corresponding to the last memory row, which is the row $r_4$. The counter now counts in the other direction, so that the addresses of the preceding memory rows are generated until the memory row $r_C$ is addressed.

Figures 12A, 12B:
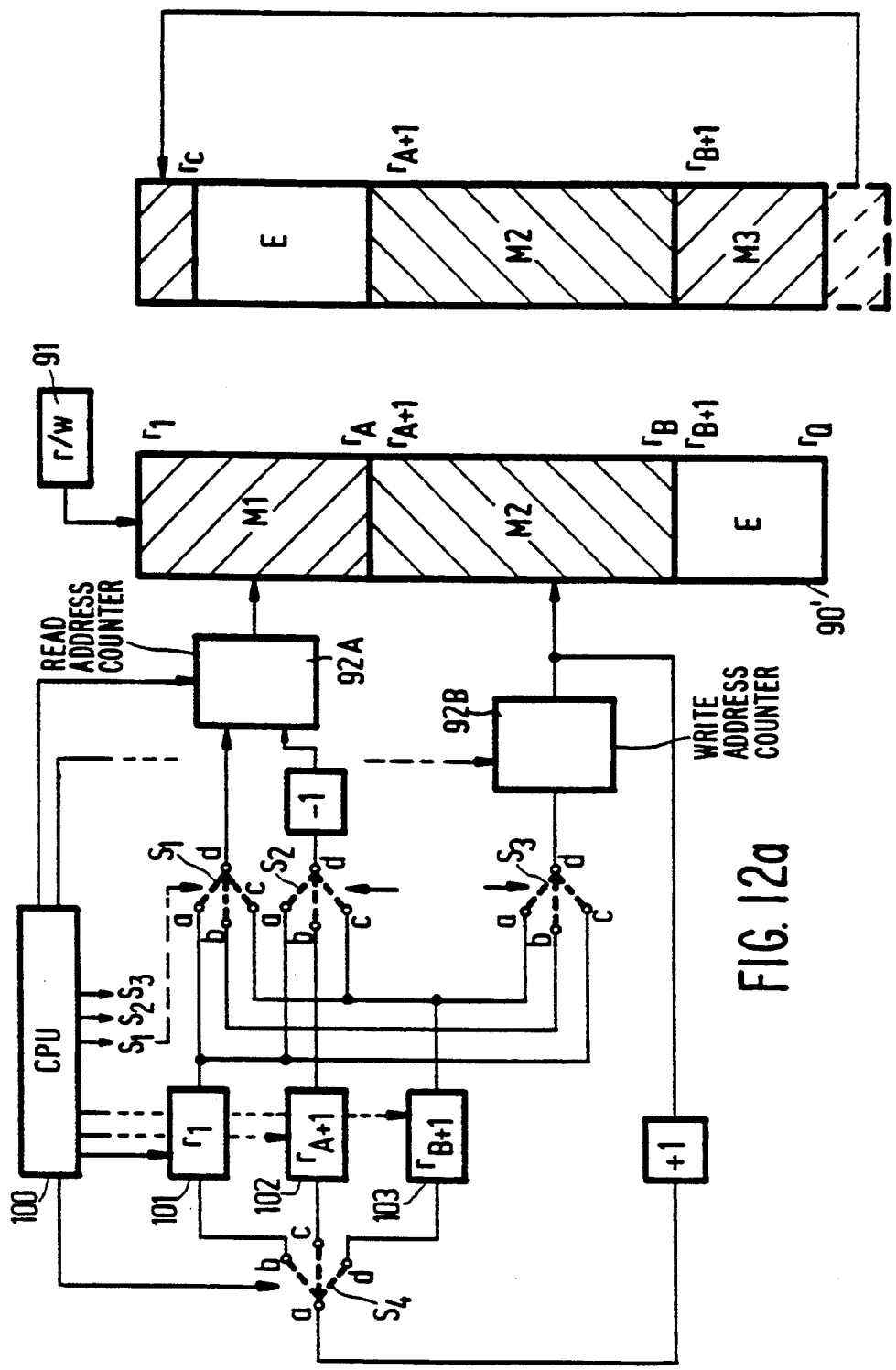
FIGS. 12a and 12b illustrate another method of storage in the storage medium.

FIGS. 12a and 12b show another method of storing two music programs in the memory 90', the two music programs being stored directly after one another in the memory 90' but the freedom as to the choice of the length of a third music program to be stored in the memory 90' yet being considerable.

FIG. 12a diagrammatically illustrates the storage of a first music program M1. This music program is stored in the memory 90' in such a way that the first frame $F_0$ is stored in the first memory row $r_1$, the second frame in the second row ... etc. The last frame $F_k$ is then stored in the row $r_A$. A second music program M2 can now be stored in the memory 90' in the rows $r_{A+1}$ through $r_B$, see FIG. 12a. At the end of the memory an empty section E remains available. The storage of the first music program M1 is realized in that the generator 91 supplies write pulses to the memory. The address $r_1$ of the first row is loaded into a write address counter 92B as the starting count. In an initial situation this starting count is stored in a first address memory 101. Under the influence of control signals from the central processing unit 100 applied to the switch S3, which is then set to position c–d, and applied to the address counter 92B, this count is loaded from the address memory 101 into the counter 92B as the initial count via the switch S3.

Under the influence of clock pulses (not shown) applied to the counter 92B, the counter 92B now counts up and consecutive counts are applied to the memory 90' as addresses, so that the first music program M1 can be stored. At the count $r_A$ the music program M1 has been read in completely and the counter 92B is stopped. Subsequently, under the influence of control signals applied to the switch S4 by the control unit 100, which switch is then set to position a–c, and applied to the address memory 102, the count $r_{A+1}$ is stored in the address memory 102.

Subsequently, the control unit 100 generates control signals for the switch S1, which is set to position a–d, for the switch S2, which is set to position b–d, for the switch S3, which is set to position b–d, and for the counters 92A and 92B. Under the influence of the control signals applied to the counters 92A and 92B the count $r_1$ is loaded into the counter 92A as the initial count and the count $r_A$ as the final count, and the count $r_{A+1}$ is loaded into the counter 92B as the initial count. The counter 92A now counts cyclically from $r_1$ through $r_A$ for the repeated read-out of the music program M1.

Thus, the music program M2 is stored under the influence of the addresses $r_{A+1}, r_{A+2}, \ldots, I_B$ applied to the memory 90' by the counter 92B. Once the music program has been loaded completely into the memory 90' the count $r_{B+1}$ is stored in the address memory 103 under the influence of control signals from the control unit 100 which are applied to the switch S4, which is set to position a–d, and to the address counter 103. For subsequently reading the second music program M2 repeatedly from the memory 90', the control unit 100 generates control signals, which are applied to the switch S1, which is set to position b–d, and to the switch S2, which is set to position c–d. Under the influence of a control signal the count $r_{A+1}$ is now applied to the counter 92A and is loaded into this counter as the initial count. Moreover, the count $r_B$ is loaded into this counter as the final count. The counter 92A can now count cyclically $r_{A+1}$ to $r_B$, so that the music program M2 can be read out repeatedly. In order to load a third music program M3 into the memory 90' the switch S3 is set to position a–d, so that the count $r_{B+1}$ can be loaded into the counter 92B. Subsequently, the counter 92B addresses consecutive storage locations (or rows) $r_{B+1}$, $r_{B+2}, \ldots$ etc. As soon as the counter 92B has addressed the last storage location (or row) $r_Q$ the counter 92B continues to count and restarts counting from $r_1$. Thus, the remainder of the information content of the music program M3 is stored at the beginning of the memory 90', overwriting the first music program. This is illustrated in FIG. 12b. After the music program M3 has been stored in the memory 90' the switch S4 is set to position a–b and the address $r_{c+1}$ is stored in the memory 101 instead of $r_1$. For the repeated read-out of the music program M3 the switch S1 is now set to position c–d and the switch S2 is set to position a–d. Thus, the count $r_{B+1}$ is stored in the counter 92A as the initial count and the count $r_c$ as the final count. Subsequently, the counter 92A counts from $r_{B+1}$ via $r_Q, r_1, \ldots$ to $r_c$, after which it each time counts cyclically from $r_{B+1}$ to $r_c$.

For the storage of a fourth music program the switch S3 is set to position c–d, so that the count $r_{c+1}$ can be stored in the counter 92B as the initial count. It is obvious that the method of storing the two music programs as described with reference to FIGS. 11 and 12 is, in fact, independent of the signal processing method of the digital information as performed by means of the signal processing unit 9.

In the above description it has been assumed implicity that the arrangement shown in FIGS. 12a and 12b comprises only one downloader 8, one signal processing unit 11 and one recording device 12. This implies that it is not possible to load or read two music programs more or less simultaneously into/from the memory 90'.

Simultaneously loading the first music program M1 and the second music program M2 will be difficult because as long as the first music program M1 has not been stored completely the address $r_A$ and hence the initial address $r_{A+1}$ for the storage of the second music program, is not yet known. Conversely, once they have been stored in the memory the two music programs can be read out more or less simultaneously. However, the construction of such an arrangement then differs from the arrangement shown in FIGS. 12a and 12b. On the basis of the above information about the more or less simultaneous read-out of two music programs M1 and M2, the expert will be able to simply derive the modifications required in the arrangement shown in FIGS. 12a and 12b, without an inventive step being involved. Duplicating arrangements as described with reference to FIG. 1b can be supplied as one unit to be installed at manufacturers of prerecorded digital music cassettes.

In those cases in which the digital memory 90 can store at the most one music program, the first and the second signal processing steps are, in fact, performed separately after one another. For the first signal processing step an arrangement is needed which should comprise only the parts bearing the reference numerals 8, 9 and 10. For the second signal processing step an arrangement is required which should comprise only the parts bearing the reference numerals 10, 11 and 12. In order to enable the production of prerecorded cassettes to be stepped up further, one or more units 12 may be connected to the output of the unit 11, in parallel with the unit 12 shown in FIG. 1b.

It is to be noted that the invention is not limited to the embodiments disclosed herein. Various modifications of the embodiments described are possible without departing from the inventive scope as defined in the claims.

We claim:

1. An arrangement for reading a digital audio signal from a master medium and storing it in a digital storage medium at a first bit rate, in a first step, and for repeatedly reading the digital audio signal from the digital storage medium and recording it on a recording medium at a second bit rate, in a second step, to obtain prerecorded record carriers on each of which the digital audio signal, which is a representation of a specific music program, has been recorded, the arrangement comprising:

read means for reading the digital audio signal from the master medium;

a digital storage medium, said digital storage medium having a storage capacity greater than that required for storing a digital information signal representing a music program of maximum length that can be recorded on said prerecorded record carrier;

recording means for recording the digital audio signal on the recording medium;

first circuit means for processing the digital audio signal read from the master medium and for applying said processed digital audio signal to the digital storage medium; and;

second circuit means for processing digital information read from the digital storage medium to obtain a digital signal which substantially corresponds to the digital audio signal, characterized in that the digital storage medium is adapted to store a digital information signal which is a representation of a first music program, and a digital information signal which is a representation of a second music program, in that the arrangement is adapted to read the digital information signal representing the second music program into the digital storage medium in a third step, said third step, viewed in time, at least partly concurring with at least a part of the second step of repeatedly reading out the digital information signal representing the first music program.

2. An arrangement as claimed in claim 1, characterized in that the digital storage medium has a storage capacity which is smaller than twice the storage capacity required for the storage of a digital information signal representing a music program of maximum length that can be recorded on said prerecorded record carrier.

3. An arrangement as claimed in claim 2, characterized in that the arrangement is adapted to repeatedly read out the digital information signal representing the second music program in a fourth step following the third step.

4. An arrangement as claimed in claim 1, characterized in that the arrangement is adapted to repeatedly read out the digital information signal representing the second music program in a fourth step following the third step.

5. An arrangement as claimed in claim 4, characterized in that the arrangement is adapted to read a digital information signal representing a third music program into the digital storage medium during a fifth step following the second or the fourth step.

* * * * *